(12) United States Patent
Hart et al.

(10) Patent No.: US 10,812,594 B2
(45) Date of Patent: Oct. 20, 2020

(54) DEVELOPMENT PLATFORM FOR INDUSTRIAL INTERNET APPLICATIONS

(71) Applicant: GENERAL ELECTRIC COMPANY, Schenectady, NY (US)

(72) Inventors: Michael Hart, San Ramon, CA (US); Milton Waid, San Ramon, CA (US); Andy Johns, San Ramon, CA (US); Jeremy Osterhoudt, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/529,143

(22) Filed: Aug. 1, 2019

(65) Prior Publication Data

US 2019/0356739 A1    Nov. 21, 2019

Related U.S. Application Data

(63) Continuation of application No. 15/372,199, filed on Dec. 7, 2016, now Pat. No. 10,397,331.

(60) Provisional application No. 62/289,038, filed on Jan. 29, 2016.

(51) Int. Cl.
| | | |
|---|---|---|
| *H04L 29/08* | (2006.01) | |
| *G05B 19/042* | (2006.01) | |
| *G06F 16/951* | (2019.01) | |

(52) U.S. Cl.
CPC .......... *H04L 67/12* (2013.01); *G05B 19/0428* (2013.01); *H04L 67/1095* (2013.01); *G05B 2219/23301* (2013.01); *G06F 16/951* (2019.01); *H04L 67/141* (2013.01); *Y02P 90/265* (2015.11)

(58) Field of Classification Search
CPC ... G05B 19/042; H04L 67/12; H04L 67/1095; H04L 67/141; H04L 67/125; G06F 21/53
See application file for complete search history.

(56) References Cited

U.S. PATENT DOCUMENTS

2017/0060574 A1*  3/2017  Malladi ............... G06F 8/70
2019/0369984 A1* 12/2019  Malladi ............ H04L 12/2823

* cited by examiner

*Primary Examiner* — Changhyun Yi
(74) *Attorney, Agent, or Firm* — Buckley, Maschoff & Talwalkar LLC

(57) ABSTRACT

Systems and methods are presented for a mobile device comprising an industrial internet application container comprising a database service for syncing data related to one or more industrial assets between a database of the mobile device and a data domain and syncing data between the data domain and the database of the mobile device.

20 Claims, 10 Drawing Sheets

DEVELOPMENT PLATFORM FOR INDUSTRIAL INTERNET APPLICATIONS

CROSS-REFERENCE TO RELATED APPLICATIONS

This application is a continuation of U.S. patent application Ser. No. 15/372,199, filed on Dec. 7, 2016, which claims priority under 35 USC § 119(e) to U.S. Provisional Patent Application No. 62/289,038, filed on Jan. 29, 2016, which are incorporated herein by reference herein in their entireties.

BACKGROUND

Embedded software and connectivity among industrial assets presents an opportunity for businesses to alter and enhance operations, for example in fields of manufacturing, energy, agriculture, or transportation, among others. This connectivity among industrial assets is sometimes referred to as the Industrial Internet of Things (IIoT).

Until now, industrial internet applications have existed in siloed, one-off implementations. Among other things, a siloed approach limits opportunities to create economies of scale, and fails to unlock the potential of connecting multiple machines and data around the globe.

Moreover, many industrial assets are regulated by government entities and require components to be inspected on a regular cycle according to specifications and requirements for the asset. Furthermore, many assets are mission critical and thus, information (e.g., specifications, requirements, status of assets, etc.) should be available regardless of the location of the asset or whether there is network connectivity.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
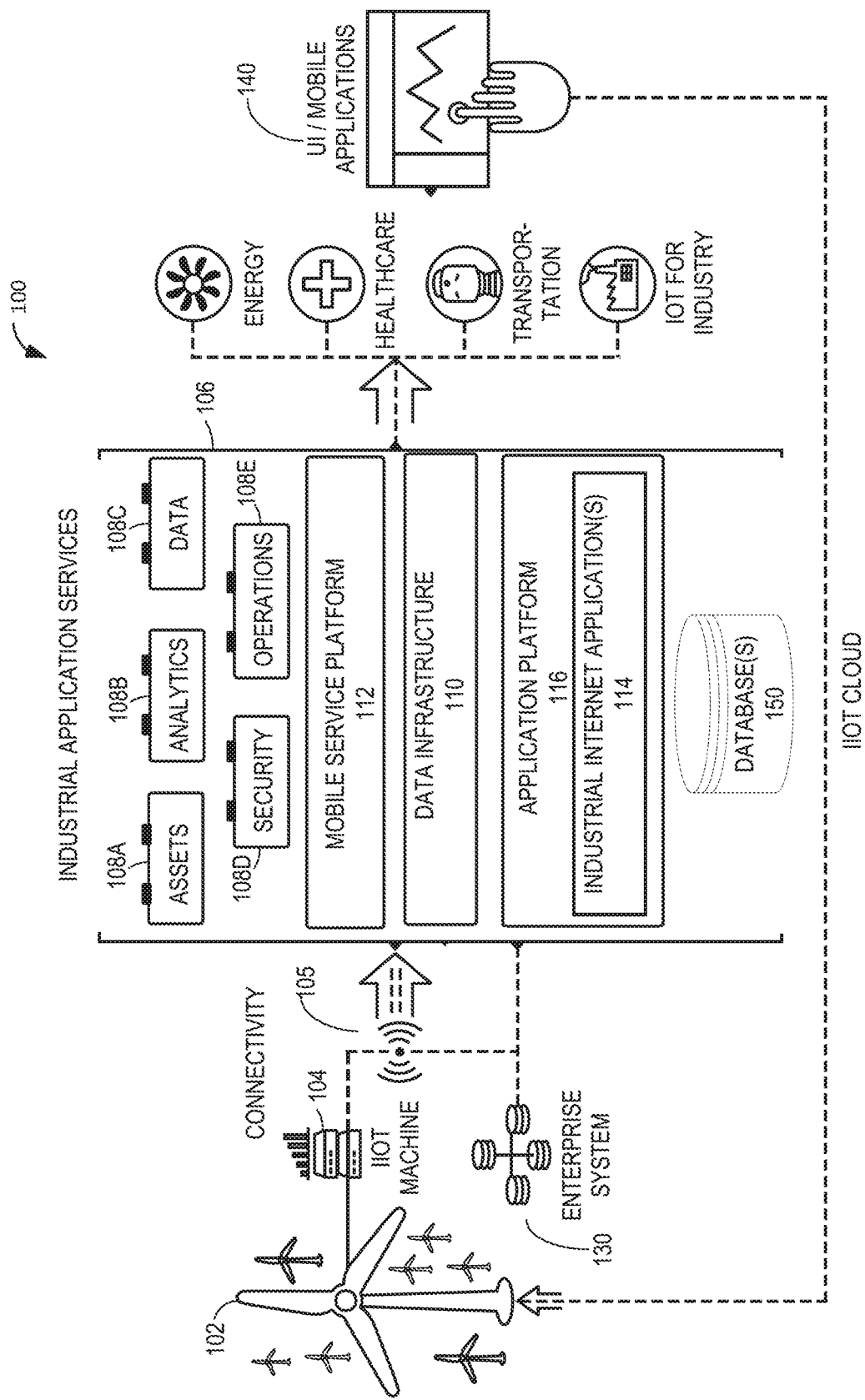
FIG. 1 is a block diagram illustrating an industrial asset management system, according to some example embodiments.

Embodiments described herein provide an industrial asset cloud computing system and platform to connect applications with data users need, irrespective of continuous network connectivity. The industrial asset cloud computing system comprises an asset cloud computing system comprising a mobile service and a client software development kit (SDK). The mobile service may be a mobile backend service running on a cloud computing system that may be used by cross platform industrial internet applications that developers build using the SDK. The mobile service may comprise a set of core microservices configured to provide functionality to support industrial internet applications and integration with enterprise systems, third-party systems, and services including at least one of machine, asset, analytics, and security. The client SDK may comprise a mobile application container configured to provide a runtime system on top of a native library, developer command line tool and scripts, and documentation. The system may include a service-based architecture inside the container and an extensible SDK.

The system described herein provides for a number of benefits. For example, the system allows developers of application to quickly design, develop, and deploy industrial internet applications that run on mobile devices. Another example is that the system enables the broadest use of mobile devices in the most secure manner possible.

Moreover, the system allows for information to be available on a mobile device regardless of network connectivity. For example, a user of an industrial internet application on a mobile device may need to maintain hospital equipment, such as CAT scans and MRI machines. The user needs detailed information about the machines to maintain the machines, but the machines may be inside a shielded room wherein there is no network connectivity. Some example embodiments described herein support offline capabilities so that a user may still access information needed for maintenance.

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often takes into account both the physics of the task at hand, as well as the environment in which such assets are configured to operate.

In an example, an industrial asset can be outfitted with one or more sensors configured to monitor an asset's operations or conditions. Data from the one or more sensors can be recorded or transmitted to a cloud-based or other remote computing environment. By bringing such data into a cloud-based computing environment, new software applications can be constructed, and new physics-based analytics can be created. Insights gained through analysis of such data can lead to enhanced asset designs, or to enhanced software algorithms for operating the same or similar asset at its edge, that is, at the extremes of its expected or available operating conditions.

Systems and methods described herein are configured for managing industrial assets. In an example, information about industrial assets and their use conditions, such as gathered from sensors embedded at or near industrial assets themselves, can be aggregated, analyzed, and processed in software residing locally or remotely from the assets. In an example, applications configured to operate at a local or remote processor can be provided to optimize an industrial asset for operation in a business context. In an example, a development platform can be provided to enable end-users to develop their own applications for interfacing with and optimizing industrial assets and relationships between various industrial assets and the cloud. Such end-user-developed applications can operate at the device, fleet, enterprise, or global level by leveraging cloud or distributed computing resources.

The systems and methods for managing industrial assets can include or can be a portion of an Industrial Internet of Things (IIoT). In an example, an IIoT connects industrial assets, such as turbines, jet engines, and locomotives to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets.

A cloud computing system may include at least one server computer, at least one database, and a plurality of users or assets that are in data communication with the cloud computing system. The cloud computing system can further include or can be coupled with one or more processor circuits or modules configured to perform a specific task, such as to perform tasks related to asset maintenance, analytics, data storage, security, or some other function, as further described herein.

In an example, a manufacturer of industrial assets can be uniquely situated to leverage its understanding of industrial assets themselves, models of such assets, and industrial operations or applications of such assets, to create new value for industrial customers through asset insights. In an example, an asset management platform (AMP) or system can incorporate a manufacturer's asset knowledge with a set of development tools and best practices that enable asset users to bridge gaps between software and operations to enhance capabilities, foster innovation, and ultimately provide economic value.

FIG. 1 illustrates an example of portions of an asset management platform (AMP) 100 or system. As further described herein, one or more portions of an AMP 100 may reside in an asset cloud computing system 106, in a local or sandboxed environment, or may be distributed across multiple locations or devices. An AMP 100 may be configured to perform any one or more of data acquisition, data analysis, or data exchange with local or remote assets, or with other task-specific processing devices.

Components and entities of the AMP 100 may communicate over a network, such as an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The AMP 100 includes an asset community 102 that is communicatively coupled with the asset cloud computing system 106. In an example, an IIOT machine 104 receives information from, or senses information about, at least one asset member of the asset community 102, and configures the received information for exchange with the asset cloud computing system 106. In an example, the IIOT machine 104 is coupled with the asset cloud computing system 106 or with an enterprise computing system 130 via a communication gateway 105. In an example, the communication gateway 105 includes or uses a wired or wireless communication channel that extends at least from the IIOT machine 104 to the asset cloud computing system 106.

The example of FIG. 1 includes the asset community 102 with multiple wind turbine assets. Wind turbines are used in some examples herein as non-limiting examples of a type of industrial asset that can be a part of, or in data communication with, the AMP 100.

In an example, the multiple turbine members of the asset community 102 include assets from different manufacturers or vintages. The multiple turbine members of the asset community 102 may belong to one or more different asset communities, and the asset communities may be located locally or remotely from one another. For example, the members of the asset community 102 can be co-located on a single wind farm, or the members can be geographically distributed across multiple different farms. In an example, the multiple turbine members of the asset community 102 can be in use (or non-use) under similar or dissimilar environmental conditions, or can have one or more other common or distinguishing characteristics.

FIG. 1 further includes the communication gateway 105 configured to couple the asset community 102 with an asset cloud computing system 106. The communication gateway 105 may further couple the asset cloud computing system 106 with one or more other assets or asset communities, to an enterprise computing system 130, or to one or more other devices. The communication gateway 105 can connect assets of a particular type, source, or vintage, or the communication gateway 105 can connect assets of multiple different types, sources, or vintages. In an example, the multiple connected assets can belong to different asset communities (e.g., notional groups of assets that are assigned by the end user and/or by the AMP 100), and the asset communities can be located remotely or locally to one another. The multiple connected assets can be in use (or non-use) under similar or dissimilar environmental conditions, or can have one or more other common or distinguishing characteristics. In an example, information about environmental or operating conditions of an asset or an asset community can be shared with the AMP 100. Using the AMP 100, operational models of one or more assets can be improved and subsequently leveraged to optimize assets in the same community or in a different community.

The AMP 100 thus represents a scalable industrial solution that extends from a physical or virtual asset (e.g., a wind turbine in asset community 102) to a remote asset cloud computing system 106. The asset cloud computing system 106 optionally includes a local, system, enterprise, or global computing infrastructure that can be optimized for industrial data workloads, secure data communication, and compliance with regulatory requirements.

In an example, information from an asset, about the asset, or sensed by an asset itself may be communicated from the asset to the data acquisition module 108C in the asset cloud computing system 106. In an example, an external sensor may be used to sense information about a function of an asset, or to sense information about an environment condition at or near an asset. The external sensor may be configured for data communication with the communication gateway 105 and the data acquisition module 108C, and the asset cloud computing system 106 may be configured to use the sensor information in its analysis of one or more assets, such as using the analytics module 108B.

In an example, the AMP 100 may use the asset cloud computing system 106 to retrieve an operational model for a wind turbine, such as using the assets module 108A. The model may be stored locally in the asset cloud computing system 106, or the model may be stored at the enterprise computing system 130, or the model may be stored elsewhere. The asset cloud computing system 106 may use the analytics module 108B to apply information received about the wind turbine or its operating conditions (e.g., received via the communication gateway 105) to or with the retrieved operational model. Using a result from the analytics module 108B, the operational model may optionally be updated, such as for subsequent use in optimizing the wind turbine or one or more other assets, such as one or more assets in the same or different asset community. For example, information about the wind turbine may be analyzed at the asset cloud computing system 106 to inform selection of an operating parameter for a remotely located second wind turbine that belongs to a different asset community.

The IIOT machine 104 may include a software layer configured for communication with one or more industrial assets and the asset cloud computing system 106. In an example, the IIOT machine 104 may be configured to run an application locally at an asset, such as at a wind turbine. The IIOT machine 104 may be configured for use with or installed on gateways, industrial controllers, sensors, and other components. In an example, the IIOT machine 104 may include a hardware circuit with a processor that is configured to execute software instructions to receive information about an asset, optionally process or apply the received information, and then selectively transmit the same or different information to the asset cloud computing system 106.

In an example, an AMP 100 may be configured to aid in optimizing operations or preparing or executing predictive maintenance for industrial assets. An AMP 100 may leverage multiple platform components to predict problem conditions and conduct preventative maintenance, thereby reducing unplanned downtimes. In an example, the IIOT machine 104 may be configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit may apply analytics or algorithms at the IIOT machine 104 or at the asset cloud computing system 106.

In response to the detected error conditions, the AMP 100 may issue various mitigating commands to the asset, such as via the IIOT machine 104, for manual or automatic implementation at the asset. In an example, the AMP 100 may provide a shut-down command to the asset in response to a detected error condition. Shutting down an asset before an error condition becomes fatal can help to mitigate potential losses or to reduce damage to the asset or its surroundings. In addition to such an edge-level application, the IIOT machine 104 may communicate asset information to the asset cloud computing system 106.

In an example, the asset cloud computing system 106 may store or retrieve operational data for multiple similar assets. Over time, data scientists or machine learning may identify patterns and, based on the patterns, may create improved physics-based analytical models for identifying or mitigating issues at a particular asset or asset type. The improved analytics can be pushed back to all or a subset of the assets, such as via multiple respective IIOT machines 104, to effectively and efficiently improve performance of designated (e.g., similarly-situated) assets.

FIG. 1 further includes an interface device 140. The interface device 140 may be configured for data communication with one or more of the IIOT machine 104, the gateway 105, or the asset cloud computing system 106. The interface device 140 may comprise, but is not limited to, a mobile phone, desktop computer, laptop, computer console, portable digital assistants (PDAs), smart phones, tablets, ultra books, netbooks, laptops, multi-processor systems, microprocessor-based or programmable consumer electronics, or any other communication device that a user may utilize to access the AMP 100. In some embodiments, the interface device 140 comprises a display module (not shown) to display information (e.g., in the form of user interfaces). In further embodiments, the interface device 140 comprises one or more of touch screens, accelerometers, gyroscopes, cameras, microphones, global positioning system (GPS) devices, and so forth.

The interface device 140 may be used to monitor or control one or more assets. In an example, information about the asset community 102 may be presented to an operator at the interface device 140. The information about the asset community 102 may include information from the IIOT machine 104, or the information may include information from the asset cloud computing system 106. In an example, the information from the asset cloud computing system 106 includes information about the asset community 102 in the context of multiple other similar or dissimilar assets, and the interface device 140 can include options for optimizing one or more members of the asset community 102 based on analytics performed at the asset cloud computing system 106. Moreover, the interface device 140 may access and utilize one or more industrial internet applications 114 hosted by the application platform 116.

In an example, an operator may select a parameter update for a particular industrial asset, such as one of the wind turbines in example asset community 102, using the interface device 140, and the parameter update is pushed to the wind turbine via one or more of the asset cloud computing system 106, the gateway 105, and the IIOT machine 104. In an example, the interface device 140 is in data communication with the enterprise computing system 130, and the interface device 140 provides an operation with enterprise-wide data about the first asset community 102 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 140, the asset cloud computing system 106, the enterprise computing system 130, or elsewhere.

The asset cloud computing system 106 may include various industrial internet application services and related components. These services and components may be hosted on one or more server computers and may utilize one or more databases 150 for storing various data related to industrial assets, industrial internet applications 114, users accessing and utilizing the asset cloud computing system 106, etc. For example, the asset cloud computing system 106 may provide services for applications designed by developers, such as asset services from assets module 108A, analytics services from analytics module 108B, data services from data module 108C, application security services from security module 108D, and operational services from operations module 108E. Moreover, the asset cloud computing system 106 may include a data infrastructure 110.

Asset services provided by assets module 108A may include services to create, import, and organize asset models and their associated business rules.

The asset model may be the centerpiece of many, if not all, industrial internet applications. While assets are the instantiations of asset types (types of industrial equipment, such as turbines), the asset model is a digital representation of the asset's structure. In an example embodiment, the assets module 108A provides Application Program Interfaces (APIs), such as Representational State Transfer (REST) APIs that enable application developers to create and store asset models that define asset properties, as well as relationships between assets and other modeling elements. Application developers can then leverage the service to store asset-instance data. For example, an application developer can create an asset model that describes the logical component structure of all turbines in a wind farm and then create instances of that model to represent each individual turbine. Developers can also create custom modeling objects to meet their own unique domain needs.

In an example embodiment, the assets module 108A includes an API layer, a query engine, and a graph database. The API layer acts to translate data for storage and query in the graph database. The query engine enables developers to use a standardized language, such as Graph Expression Language (GEL), to retrieve data about any object or property of any object in the asset service data store. The graph database stores the data.

An asset model represents the information that application developers store about assets, how assets are organized, and how they are related. Application developers can use the assets module 108A APIs to define a consistent asset model and a hierarchical structure for the data. Each piece of physical equipment may then be represented by an asset instance. Assets can be organized by classification and by any number of custom modeling objects. For example, an organization can use a location object to store data about where its pumps are manufactured, and then use a manufacturer object to store data about specific pump suppliers. It can also use several classifications of pumps to define pump types, assign multiple attributes, such as Brass or Steel, to each classification, and associate multiple meters, such as Flow or Pressure, to a classification.

Data services provided by data module 108C may include services to ingest, clean, merge, and ultimately store data in the appropriate storage technology so that it can be made available to applications in the manner most suitable to their use case. Data services from the data module 108C enable industrial internet application developers to bring data into the asset cloud computing system 106 and make it available for their applications. This data may be ingested via an ingestion pipeline that allows for the data to be cleansed, merged with data from other data sources, and stored in the appropriate type of data store, whether it be a time series data store for sensor data, a Binary Large Object (BLOB) store for medical images, or a relational database management system (RDBMS).

Since many of the assets are industrial in nature, much of the data that will commonly be brought into the AMP 100 for analysis is sensor data from industrial assets. In an example embodiment, a time series service may provide a query efficient columnar storage format optimized for time series data. As the continuous stream of information flows from sensors and needs to be analyzed based on the time aspect, the arrival time of each stream can be maintained and indexed in this storage format for faster queries. The time series service also may provide the ability to efficiently ingest massive amounts of data based on extensible data models. The time series service capabilities address operational challenges posed by the volume, velocity, and variety of IIoT data, such as efficient storage of time series data, indexing of data for quick retrieval, high availability, horizontal scalability, and data point precision.

Analytics services provided by analytics module 108B may include services to create, catalog, and orchestrate analytics that will serve as the basis for applications to create insights about industrial assets.

Application security services provided by security module 108D may include services to meet end-to-end security requirements, including those related to authentication and authorization. The application security services provided by the security module 108D may include user account and authentication (UAA) and access control. The UAA service provides a mechanism for applications to authenticate users by setting up a UAA zone. An application developer can bind the application to the UAA service and then use services such as basic login and logout support for the application, without needing to recode these services for each application. Access control may be provided as a policy-drive authorization service that enables applications to create access restrictions to resources based on a number of criteria.

Operational services provided by operations module 108E may enable application developers to manage the lifecycle and commercialization of their applications. The operational services may include services that developers can use to build or test industrial internet applications, or services to implement industrial internet applications, such as in coordination with one or more other AMP modules. In an example, the operations services may include a microservices marketplace where developers can publish their services and/or retrieve services from third parties. The operations services may include a development framework for communicating with various available services or modules. The development framework can offer developers a consistent look and feel and a contextual user experience in web or mobile applications.

Operational services may include development operational services, which are services to develop and deploy industrial internet applications in the cloud, and business operational services, which are services that enable transparency in the usage of Industrial internet applications so that developers can ensure profitability.

The application platform 116 may provide development services for developers that may include tools to create and run industrial internet applications 114 in the asset cloud computing system 106. In an example, the development services include tools to facilitate building, testing, and deploying new tools. In an example, the development services may include various features for facilitating automation. Tools for source control management, agile planning, automated build and deploy, or testing can be helpful for efficiently moving code through the pipeline from development to production.

In an example, the development services may include source control management (SCM). For example, a hosted SCM system may be made available for storing application source code. Developers may move existing project code or create a new project by using portions of example applications already on the platform.

In an example, the development services may include a continuous delivery (CD) pipeline that can be configured to automate software builds, tests, and deployments. The CD pipeline may be configured to ensure predictability from the beginning of the development cycle through production delivery. It checks that build processes are working, and enables rapid and repeatable provisioning of new environments. With these CD tools, application developers may create a pipeline with automated build, test, and deploy capabilities to shorten the time-to-value for customers.

The application platform 116 may comprise one or more industrial internet applications 114 created by one or more application developers. The one or more industrial internet applications 114 may run on the asset cloud computing system 106 and be hosted by the application platform 116. For example, the application platform 116 may comprise one or more server computers and may utilize one or more databases 150.

Figure 2:
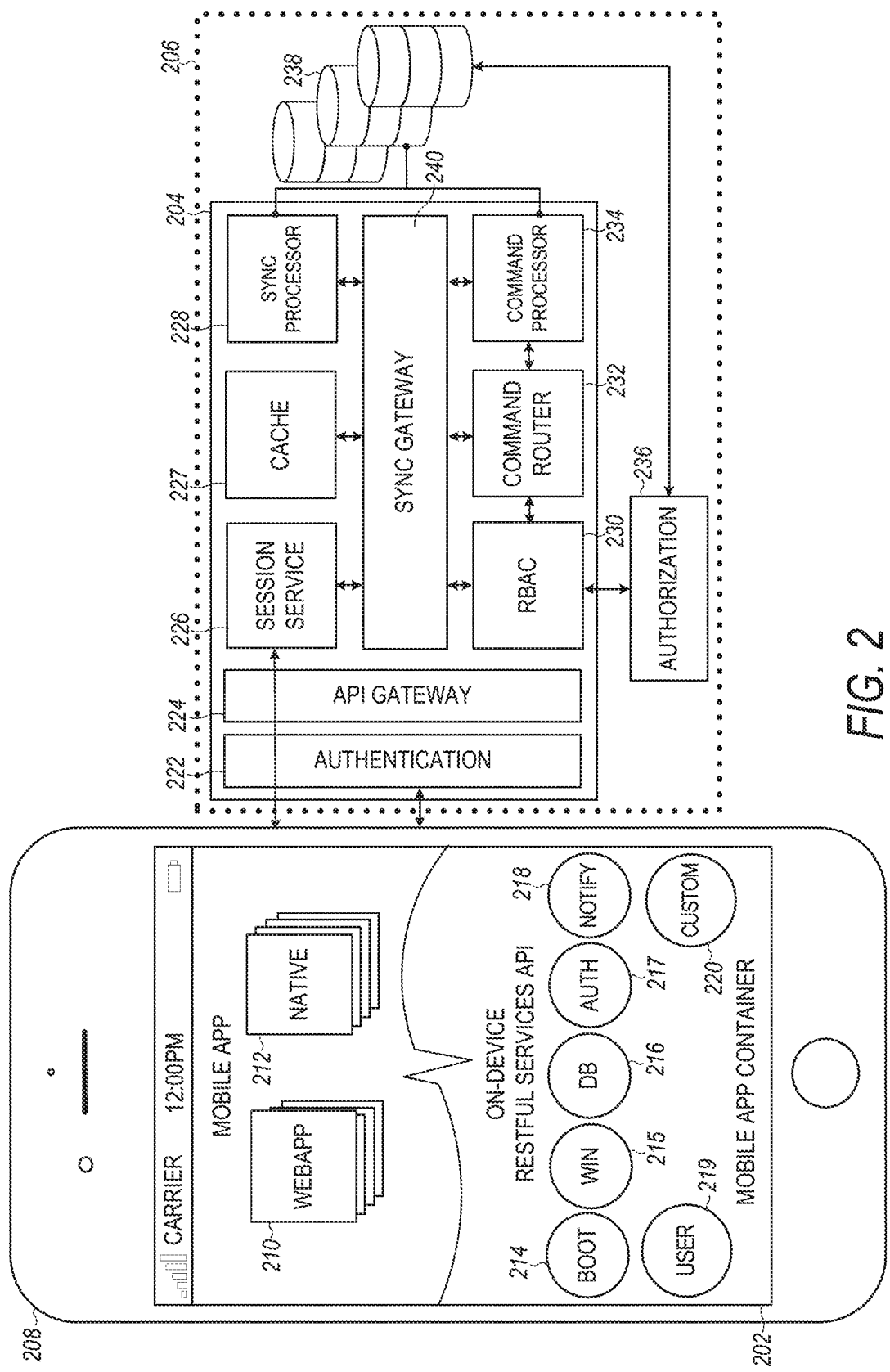
FIG. 2 is a block diagram illustrating an instance of a software development kit (SDK) on an interface device and an IIOT cloud comprising a mobile service platform, according to some example embodiments.

FIG. 2 is a block diagram illustrating an instance of an SDK 202 on an interface device (e.g., interface device 140 from FIG. 1) such as a mobile device 208, and an IIOT cloud 206 comprising a mobile service platform 204 (e.g., mobile service platform 112 from FIG. 1). As described above, an SDK may be provided for a developer to use to create one or more mobile industrial internet applications. The industrial internet applications may be a webapp 210 or a native app 212. In one example, multiple applications may be developed and linked together.

In one example, one industrial internet application may comprise multiple webapps 210. In this example, each webapp 210 may be a separate component of the industrial internet application. For example, one webapp 210 may be developed for moving train cars from one location to another in a rail yard, and another webapp 210 may be developed for searching for cars and displaying a visual representation of the rail yard with locations of the cars. A webapp 210 may be a web application or application built with web technologies. One example of a webapp 210 is an application comprised of Web Browser interpretable languages, such as but not limited to, HTML, JavaScript, CSS, and the like.

These industrial internet applications may also be referred to herein as an application or app. An industrial internet application may be used for accessing, generating, and storing data related to one or more industrial assets. The one or more webapps 210 or native apps 212 may run on top of an on-device restful services API.

The instance of the SDK may be referred to as a mobile app container 202 or an industrial internet application container. The mobile app container 202 may comprise a number of services. For example, the mobile app container 202 may comprise a boot service 214, a window (win) service 215, a database 216, an authentication service 217, a notify service 218, a user service 219, and one or more custom services 220. This collection of services may be on-device RESTful services that may be extended, modified, and/or replaced.

The boot service 214 provides a sequence for starting up an application. The boot service 214 may start the application initialization process or reinitialize an application. The boot service 214 may be standard within the SDK such that a developer may simply use the boot service 214 as is, or the developer may develop a custom boot service which would replace the boot service 214.

The boot service uses the authentication (auth) service to manage online and offline authentication for the application. In the case where the user starts up the app for the first time the boot service delegates to the auth service to prompt the user for a password, personal identification number (PIN), an offline PIN, or other similar text or combination, which will be used in the case where the user starts the app when the app is offline.

Figure 8:
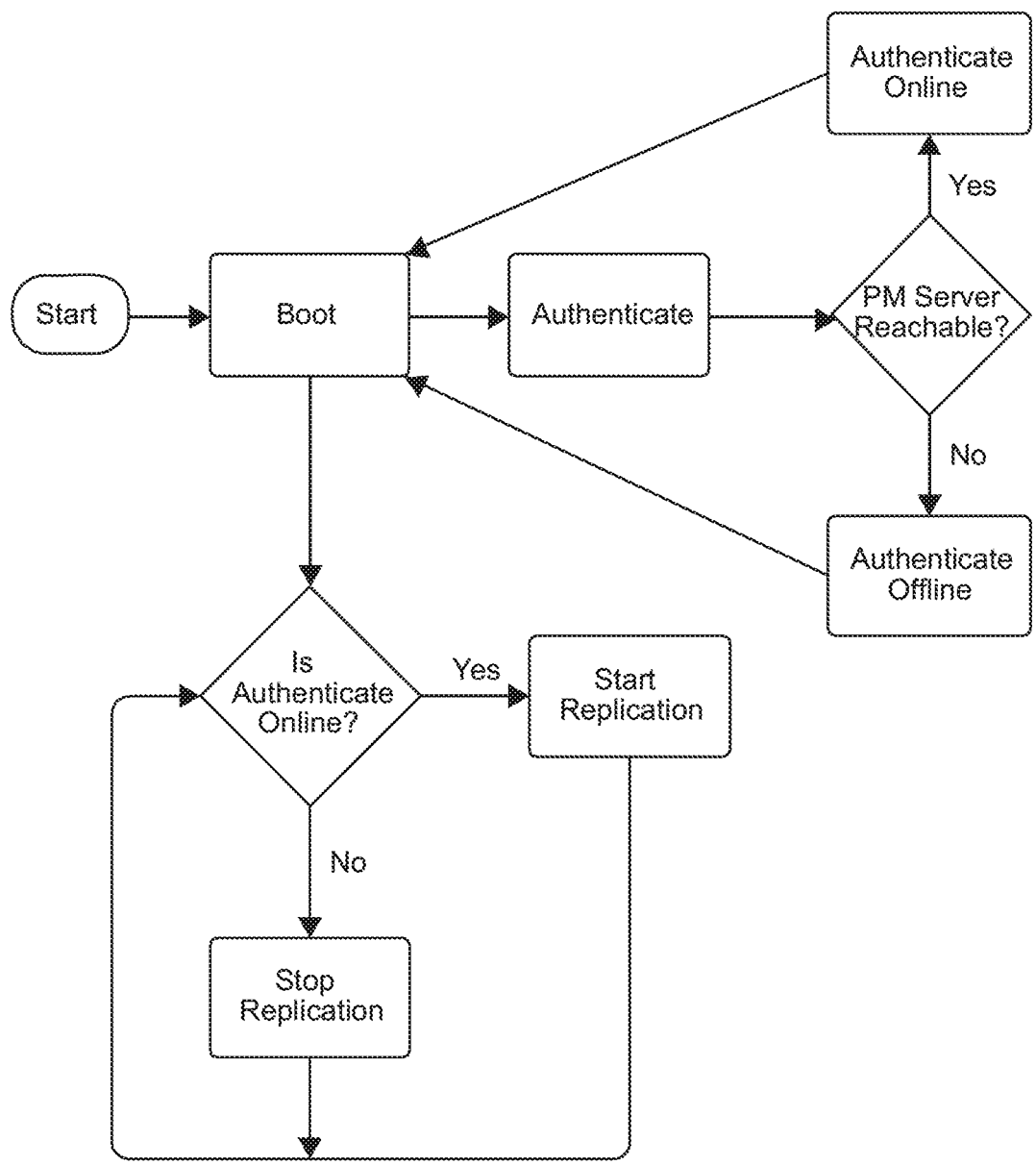
FIG. 8 is a block diagram illustrating an example of boot server state transitions, according to some example embodiments.

After the offline PIN has been created the boot service ensures that the user is authenticated via the online authentication or offline authentication. The boot service will ensure that a user that is authenticated with the offline PIN cannot access backend services until the user has been authenticated online. The diagram in FIG. 8 illustrates an example of the boot service state transitions.

An example method and Uniform Resource locator (URL) that may be used to start the application initialization process may comprise: POST http://pmapi/boot/start. An example method and URL for reinitializing an application may comprise: POST http://pmapi/boot/restart. For example, a mobile device 208 may send a request to initialize or reinitialize an application, to an industrial asset cloud computing system (e.g., a mobile service platform 204 of IIOT cloud 206). Once the user is authenticated the system (e.g., the mobile service platform 204) determines whether it is the first time the user is accessing the system and whether or not the application is loaded on the device (e.g., mobile device 208). If the application has not yet been loaded on the mobile device 208, the application will be replicated from the mobile service platform 204 and installed onto the mobile device 208 and launched. On subsequent logins any updates to the application will be replicated and launched. For example, a developer may post updates to the application at any time and the next time a user logs into the mobile service platform 208, the update will be replicated and launched on the mobile device 208. This allows a developer of the application to update the application and to publish the updates immediately.

The win service 215 may control the windows (e.g., user interface (UI) displays) in which the application is running. For example, the win service 215 may be used to manage the display of webapps 210 in the container user interface. An application may typically run in a single window; however, there may be some scenarios when an application may run in multiple windows. One example of such a scenario is an application used at a nurse's station to monitor patients. The nurse's station may be monitoring twenty patients, and thus, may have twenty windows running, one for each patient. The win service 215 keeps track of these windows. An example method and URL for loading a specified web page may comprise: POST http://pmapi/window/pane?webapp=appname. When the win service 215 receives the request, it may open up a webview (for example) on the device to load the application. The database 216 may store various data related to the mobile industrial internet application(s). For example, the database 216 may store data related to one or more industrial assets, information related to the industrial asset application, information related to a user of the industrial asset application, and so forth. The database keeps in sync with the cache database 227 in the mobile service platform 204, and thus, keeps in sync with a data domain 238 (as explained in further detail below). In one example, the database 216 may be a NoSQL database. Database services may be provided that provide local database management services. The database services may comprise a data access high-level service and a data access low-level service.

The data access high-level service may provide local database management services and an abstraction layer to simplify data-access interactions such as saving and retrieving documents. An example method and URL for starting replication of data and continuing as long as the device has connectivity and is authenticated may comprise: POST http://pmapi/db/databaseName/replication. An example method and URL for retrieving replication status may comprise: GET http://pmapi/db/databaseName/replication. An example method and URL for retrieving a document may comprise: GET http://pmapi/db/databaseName/document/documentId. An example method and URL for closing a database may comprise: POST http://pmapi/db/close.

The data access low-level service may perform basic data retrieval and updates for the local document database. The service may provide create, read, write, and delete document (e.g., data object) operations and query views. This service supports database-level commands (e.g., rather than server-level commands).

The authentication service 217 facilitates tasks such as login, logout, and management and validation of offline authentication credentials. For example, the authentication service 217 may request user login information (e.g., user name, password, etc.) and interface with a security module (e.g., authentication service 222) of the mobile service platform 204, to authenticate a user of the mobile industrial internet application. Authentication may be conducted via a standard of authentication such as a uniform authentication and authorization system (UAA) or other such system. Some example methods and URLs for authentication services may comprise:

| Method/URL | Description |
| --- | --- |
| POST http://pmapi/auth | Start the authentication process, displaying an offline or online authentication page. |
| POST http://pmapi/auth/setup | Start the offline authentication setup process, displaying the offline authentication setup page. |
| PUT http://pmapi/auth/<token>/setup | Set up a user's offline password by returning a token to the authentication setup page. |
| POST http://pmapi/auth/update | Start the offline authentication management process, displaying the offline management setup page where a user can change the account password. |
| PUT http://pmapi/auth/<token>/authenticate | Authenticate a user's offline password. |
| PUT http://pmapi/auth/<token>/update | Update a user's offline password. |
| DELETE http://pmapi/auth | Cancel a current in-process login or setup, resetting the authentication service to allow a new POST request. |
| GET http://pmapi/auth | Retrieve the status of the login process using HTTP Status codes |

The notify service 218 may relay event notifications from the mobile device 208 to the webapp 210, or it may alert a user at a specific time if the container app is not running. For example, the notify service 218 may run a JavaScript function in the current webapp when the following conditions are met: a specific database document (e.g., data object) changes, the application is about to go into the background, the device's connectivity state has changed, the device is currently replicating data with the server, a specific time is reached, and so forth. Other example notifications may include notifications from remote systems, such as push notifications. Another example notification may be a device state change such as backgrounding, foregrounding, termination, and changes to the physical device state itself such as location and orientation changes.

An example method and URL for utilizing event notifications may comprise: POST http://pmapi/notify/events/<notificationName>. Some examples of "notification Name," which may be subscribed to, may include ReachabilityWatcherNotification, which is posted when a reachability watcher detects a connectivity state change; DatabaseDownloadNotification, which describes the current download state; DocumentChangedNotification/<docid>, which describes document changes; and InitialReplicationCompleteNotification, posted when the local database has completed its first replication (e.g., indicating that the database is considered up-to-date and it is safe to store and retrieve data).

For example, the notify service 218 may provide notification to the mobile industrial internet application that there is data that has been changed. In one example, the notify service 218 may provide a notification to the user that a particular document in which the user may be interested has been changed. One example scenario could be a mobile industrial internet application that is used to monitor train cars in a rail yard. In the rail yard there may be users of the mobile industrial internet application that are getting orders from a train management system (e.g., source of truth or data domain 238) that keeps track of all of the train cars (e.g., location, movement, etc.). For example, the train management system may be prioritizing which cars get unloaded first, which cars get loaded first and put on the next train headed out, and so forth. The users may get orders from the train management system through their mobile devices (e.g., via the mobile industrial internet application). When a user moves a car, the user may also send a message to the back end train management system that the car has been moved. This information may be broadcast to other interested users. For instance, another mobile industrial internet application running on another user's mobile device may receive a notification of the updated car location. This may be a textual message, a digital representation of where the car is located, and so forth.

The user service 219 may comprise a user information service and a user settings service. The user information service identifies the user that is currently logged into the mobile industrial internet application. For example, the user information service may contain information such as the user's name, identity, and other properties associated with the user (e.g., contact information such as address and phone number, etc.). The user information service may be used to retrieve a logged-in user and display the user's assigned data elements (e.g., such as a work item). An example method and URL for retrieving user information may comprise: GET http://pmapi/user. An example method and URL for retrieving a specified data element for the user may comprise: GET http://pmapi/user/data-element. An example method and URL for writing the user information may comprise: POST http://pmapi/user.

The user settings service may facilitate unencrypted data storage and retrieval on a given device. The user setting service may be used to define user preferences, or to define information that needs to persist when the application stops running, but is not security-sensitive or required to be stored in the local database. An example method and URL for retrieving the user settings based on a setting key may comprise: GET http://pmapi/usersettings/settingkey. An example method and URL for retrieving all user settings may comprise: GET http://pmapi/usersettings. An example method and URL for setting the user settings based on the settings key may comprise: POST http://pmapi/usersettings/settingkey. An example method and URL for storing user settings may comprise: POST http://pmapi/usersettings. An example method and URL for deleting a specified user's settings based on a setting key may comprise: DELETE http://pmapi/usersettings/settingkey.

The base SDK may comprise the boot service 214, the win service 215, the database 216, the authentication service 217, the notify service 218 and the user service 219. In additional, the SDK may provide the ability for a developer to add one or more additional custom service 220. The one or more custom services 220 developed by the developer may be included in the mobile app container 202 and may be interfaced in the same way as the other services (e.g., as a RESTful service). For example, since the SDK is open and extensible, it gives a developer the flexibility to change the base functionality of the application container to support additional functionality that is unique to the application that the developer is building (e.g. adding a custom service to communicate directly with IIOT devices using a proprietary protocol.)

The mobile device 208 may be coupled with the IIOT cloud 206 via one or more networks as described earlier. The IIOT cloud 206 may comprise a mobile service platform 204. The mobile service platform 204 may comprise one or more server computers and may utilize one or more databases 150 for providing various services and functionality. The mobile service platform 204 supports industrial internet applications (e.g., webapp 210 and native app 212) that need offline support and integration with a data domain 238, including enterprise systems, third-party services and microservices, such as asset services 108A, analytics services 108B, data services 108C, and security services 108E as shown in FIG. 1.

The mobile service platform 204 may comprise an authentication service 222. As described above, the authentication service 222 may provide authentication services to authenticate a user of the mobile device and industrial internet application (e.g., industrial internet application 114). Authentication may be conducted via a standard of authentication such as a uniform authentication and authorization system (UAA) or other such system. Among other things, the authentication service 222 may receive and respond to authentication requests from one or more mobile devices 208.

The mobile service platform 204 may comprise an API gateway 224 that receives requests and commands from a mobile device 208 and sends data to the mobile device 208. For example, the mobile device 208 may send a request to the IIOT cloud 206 via the API gateway 224 to synchronize (sync) data between the local database 216 of mobile device 208 and the cache 227 and data domain 238.

The mobile service platform 204 may comprise a session service 226. The session service 226 may ensure users are authorized to access data from a data domain 238. For example, the session service 226 may send a message to a role-based access control system 230 (RBAC) for a user to be authorized via the authorization service 236. The RBAC 230 and/or the authorization service 236 may apply rules and policies determined by a data domain 238 for which users may access which data from the data domain 238. For example, there may be a private channel of data that only users in an executive group may be able to access.

The session service 226 may create a client session on a sync gateway 240 to establish a connection to sync data between the local database 216 of the mobile device 208 and the cache 227 and/or data domain 238. Once the connection to sync data is established, the database 216 associated with the mobile device 208 and the cache 227 may be synced. For example, whatever data the local database 216 has access to will be replicated down from the cache 227 and be put into the database 216. Updates may continue until the user of the mobile device 208 logs off or is otherwise disconnected.

The mobile service platform 204 may comprise a command router 232 to route a command, comprising instructions for providing an update to data in the data domain, to the responsible command processor 234, of a plurality of command processors, which is responsible for handling the command. In the event an error occurs, the command router 232 may update the command with the error information as a notification to the mobile industrial internet application. A command may comprise header properties that contain information for use by the command router 232 in mapping to a command processor 234. The command may further comprise a payload that contains application data for the command processor 234 to complete the command request.

The command processor 234 may comprise a plurality of processes for processing commands and for communicating with the data domain 238. In one example, a developer of an industrial internet application may develop various processes for handling commands to update data in the data domain 238. The command processor 234 may write data to the data domain 238. The command processor 234 may primarily be responsible for updating the source data in the data domain 238. The command processor 234 may also perform other tasks, such as managing data access for a user.

The sync processor 228 connects to the data domain 238 to pull data for a particular industrial internet application, related to one or more particular assets, related to a particular service region for one or more assets, and so forth. The sync processor 228 may read data from the data domain 238. For example, the sync processor 228 may detect a state change in the data domain 238, and may copy data related to the state change out of the data domain 238 and put it into the cache 227 to be replicated to all of the mobile devices 208 that have access to the data. In one example the sync processor 228 may perform the following tasks: gather data from the data domain 238, transform the data into a JSON object or document, write the document to the cache 227, define access to the JSON object.

The data pulled by the sync processor 228 may be stored in the cache 227. The cache 227 may be a NoSQL database, a document database, or other type of database, or a combination of different types of databases.

The sync processor 228 may also set up which users are authorized to access data. In one example, a developer of an industrial internet application may develop instructions for how to connect and pull data from the data domain 238 and which users are authorized to access data in the data domain 238.

The sync gateway 240 may receive commands with instructions for updating data in a data domain 238, store commands in the cache 227, receive changed data and store the changed data in the cache 227, manage sessions, and so forth.

The data domain 238 may be a source of truth for a particular entity or set of assets. For example, the data domain 238 may be a source of truth for a railroad management system that keeps track of all the assets along the rail line. The data domain 238 is shown as residing outside of the IIOT cloud 206, however, the data domain 238 may reside outside of the IIOT cloud 206 or may have some components inside the IIOT cloud 206 and some components outside the IIOT cloud 206. For example, the data domain 238 for a particular entity may comprise legacy systems that exist outside of the IIOT cloud 206 and may utilize services of the IIOT cloud 206 to extend functionality to mobile devices. The data domain 238 may comprise an asset system, a timeseries system, a blobstore, Asset Performance Management (APM), train management, health information system, sales force, and so forth.

Figure 3:
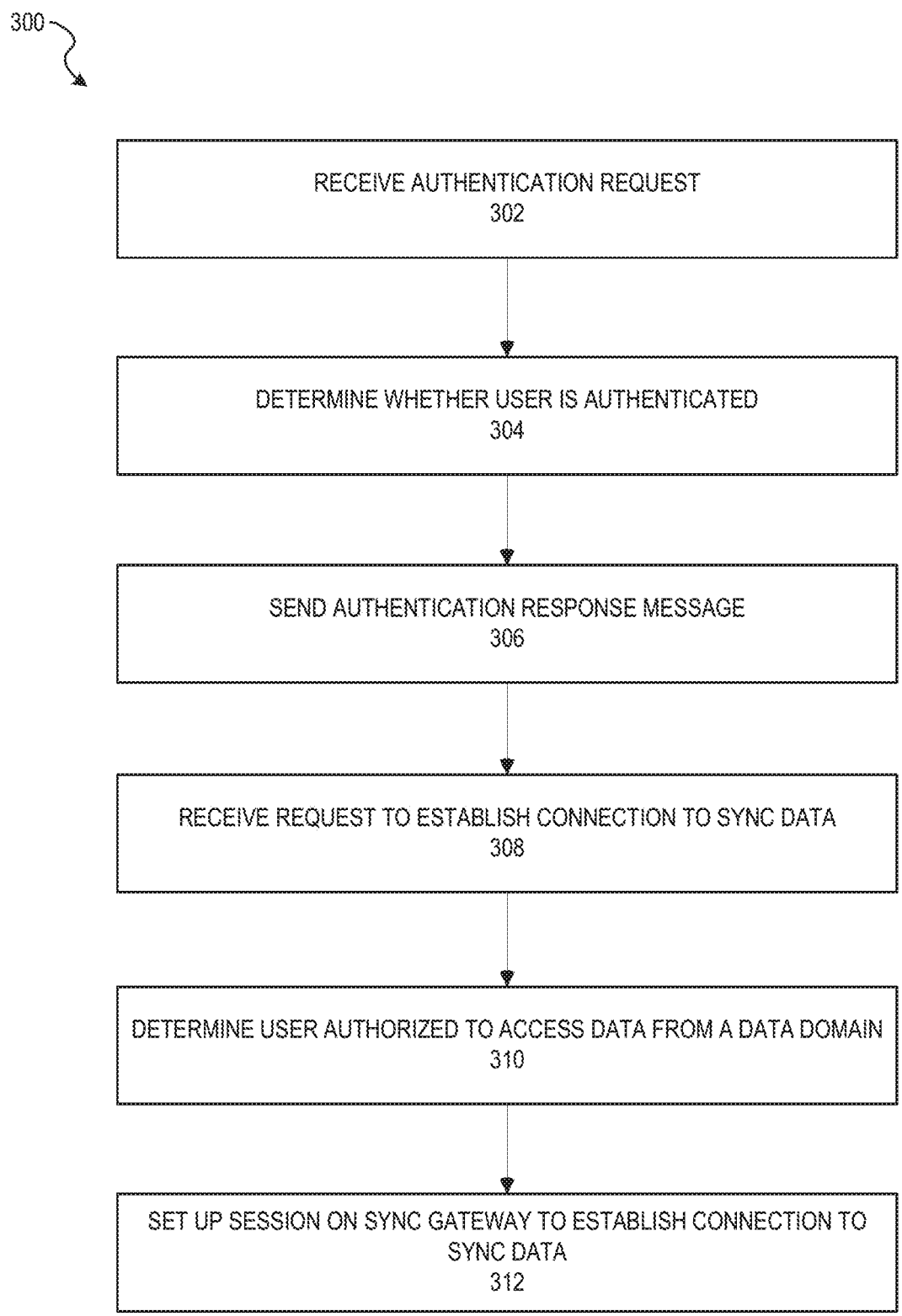
FIG. 3 is a flowchart illustrating aspects of a method for establishing a connection to synchronize data, according to some example embodiments.

FIG. 3 is a flow chart illustrating aspects of a method 300 for establishing a connection to sync data between a local database 216 of a mobile device 208 and a data domain 238, according to some example embodiments. For illustrative purposes, method 200 is described with respect to the mobile device 208 and IIOT cloud 206 of FIG. 2. It is to be understood that method 300 may be practiced with other system configurations in other embodiments.

As shown in FIG. 2, the mobile device 208 may be communicably coupled with the IIOT cloud 206 comprising a mobile service platform 204. When a user first logs into the mobile application, the authentication service 217 of the mobile app container 202 may send an authentication request message with authentication data (e.g., user name, password, etc.) to the authentication service 222 of the mobile service platform, to authenticate the user. In operation 302 of FIG. 3, a server computer associated with an industrial asset cloud computing system (e.g., via the authentication service 222) receives the authentication request message. In operation 304, the authentication service 222 determines whether the user is authenticated. For example, the authentication service 222 may verify a user name and password against a database that includes valid user names and associated passwords. In operation 306, the authentication service 222 sends an authentication response message to the authentication service 217, indicating whether or not the user is authenticated. Once the user is authenticated, the mobile device 208 may interface with the mobile service platform 204.

In operation 308, a server computer associated with the mobile service platform 204 (e.g., via API gateway 224) receives a request from a mobile device 208 to sync data between a local database 216 of the mobile device 208 and a data domain 238. The request may include an auth token and/or an authentication cookie. The API Gateway 224 may ensure that the request has a valid auth token and/or authentication cookie. If the request does not include a valid auth token and/or authentication cookie, the API Gateway 224 may redirect the request to the authentication service 222 for authentication (as described above).

In operation 310, the server computer (e.g., via session service 226) determines that a user associated with the mobile device 208 is authorized to access the mobile service platform 204. Access to the data contained in cache 227 may be configured using role-based access control system (RBAC) 230. When a user is granted access, the RBAC system 230 connects to the application domains authorization system (e.g., authorization 236) and applies access rules as expressed by the application authorization system to the data contained in the mobile service platform 204 (e.g., cache 227), controlling the data the user has access to from mobile devices that use. In one example, the server computer may send a message to a role-based access control system (RBAC) 230 which will reference the application domain authorization policies as to what specific data the user has access to. For example, a user may be restricted to only the data for their region. The RBAC system 230 may determine the user's current region and configure data access to only the data for that region.)

Based on the determination that the user is authorized to access data from the data domain 238, and which data the user is authorized to access, the server computer (e.g., via session service 226) sets up, or creates, a client session on the sync gateway 240 to establish a connection to sync data between the local database 216 of the mobile device 208 and the data domain 238, as shown in operation 312. The session may comprise one or more channels for data that the user is authorized to access. The data is then synced between the data domain 238 and the local database 216 of the mobile device 208. For example, data on the local database 216 of the mobile device 208 is updated with any changes made in the data domain 238 for which the user has access, since the last time that the user logged in or was online.

Figure 4:
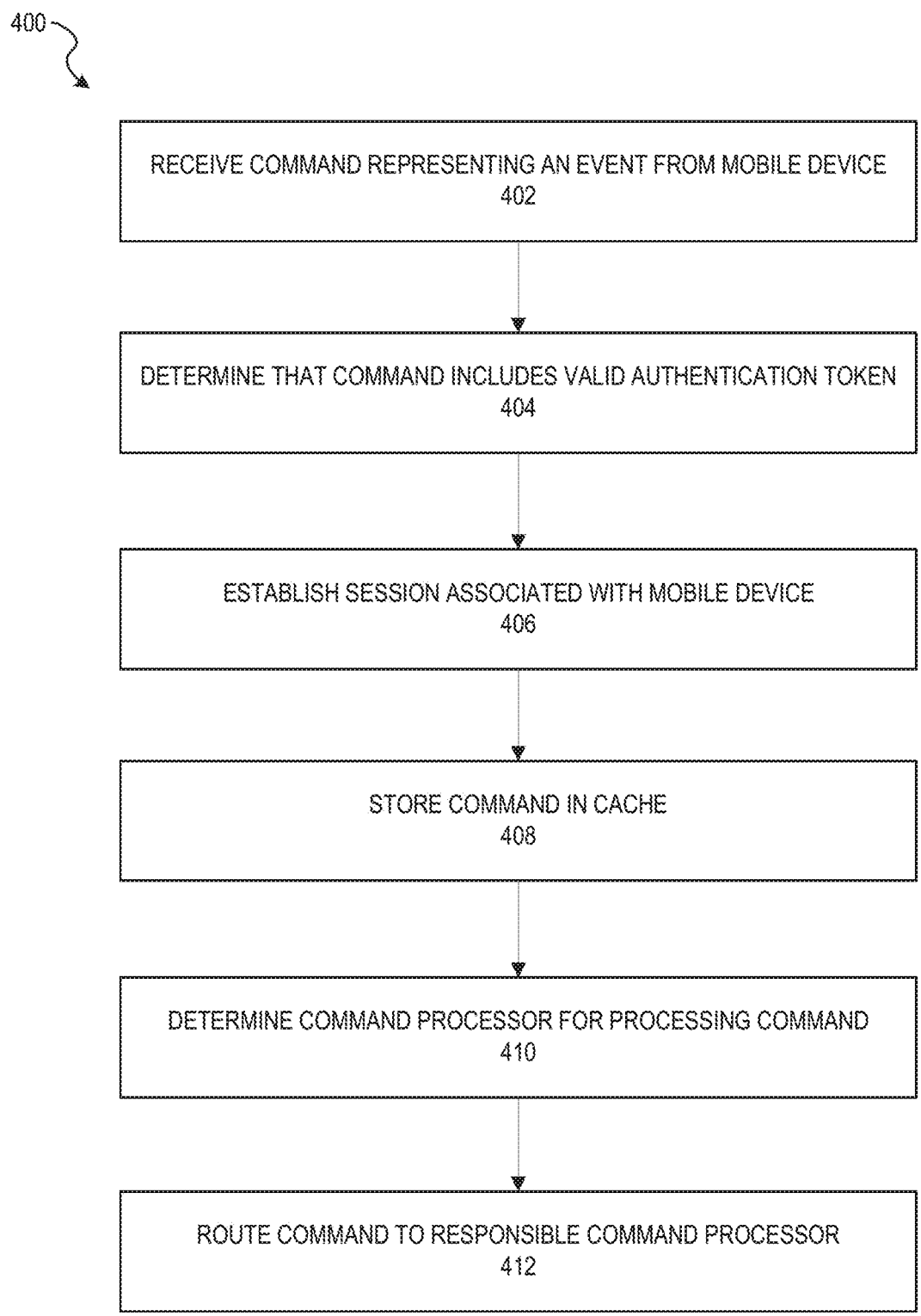
FIG. 4 is a flowchart illustrating aspects of a method for processing a command with instructions for updating an object in a data domain, according to some example embodiments.

FIG. 4 is a flow chart illustrating aspects of a method 400 for processing a command received from a mobile device 208 with instructions for updating an object in a data domain 238, according to some example embodiments. For illustrative purposes, method 400 is described with respect to the mobile device 208 and IIOT cloud 206 of FIG. 2. It is to be understood that method 400 may be practiced with other system configurations in other embodiments.

A user of a mobile device 208 may be using an industrial internet application (e.g., a webapp 210 or native app 212) on the mobile device 208 to manage or maintain various industrial assets and related services. For example, a user of a mobile device 208 may be an employee in a train yard responsible for loading, unloading, and moving cars around the train yard. The user may get orders form the train management system via the mobile device 208 and may enter data via the mobile device 208 related to actions performed on the train cars. In one example, the user may receive instructions (e.g., a work order) to move a car from one location to another location. The user may have the car moved from the one location to the other location, and indicate the car has been moved via the industrial internet application on the mobile device 208. The move (e.g., an event) may be stored as data in the local database 216 of the mobile device 208. For example, the move may be stored as a data object in the local database 216.

If the user is online, or once the user is back online, the mobile device 208 generates a command (e.g., via database services associated with local database 216) with instructions to update data in the data domain 238 to reflect the move. For example, the command may comprise an identifier for a command processor that will handle the command and process the command. In one example the identifier is a uniform resource identifier (URI). The instructions may be in the form of a payload that contains the data changes or updates. The developer of the application may determine what data will be included in the payload. For example, the payload may contain a minor update or information, or something more complex. This mechanism may be based on a design pattern such as command query responsibility segregation.

The mobile device 208 sends the command to the mobile service platform 204 via the API gateway 224. The command may be sent from the mobile device 208 via a restful services application programming interface. The command may comprise instructions for changing a data object in the data domain 238 (e.g., a train management system) associated with the train car movement (e.g., based on the change made to the data object in the local database 216 of the mobile device 208). Once the data object is updated in the data domain 238, the data object may be stored in the cache 227 and then replicated to any other databases 216 of mobile devices 208 that access the data related to the data object. As explained above, a user of a mobile device 208 that receives such an update may receive a notification of the car location, via a notify service 218.

In operation 402, a server computer associated with the mobile service platform 204 (e.g., via API gateway 224) receives the command representing an event, from a mobile device 208. In one example, the command may be a JSON object that represents the event. The command may comprise instructions for changing a data object in a data domain. The server computer may receive a plurality of commands from a plurality of mobile devices. The command may further comprise an authentication token.

In operation 404, the server computer (e.g., via API gateway 224) may determine whether the user is authenticated by determining that whether the command further comprises a valid authentication token. If the server computer determines that the user is not authenticated (e.g., the command does not comprise a valid authentication token and/or the server computer has not received an indication by other methods that the user is authenticated), the server computer may return a message to the mobile device requesting authentication. If the command comprises a valid authentication token, the server computer may proceed with processing the request. For example, the API gateway 224 may pass the command on to the session service 226.

In operation 406, the server computer (e.g., via session service 226) may determine whether a session has been established for the mobile device 208. For example, a session may have been previously established for the mobile device 208 when the mobile device 208 was first authenticated or when the server computer received a prior command. If the session service 226 determines that a session has not yet been established for the mobile device 208, the session service 226 will create a session with the sync gateway 240. To establish a session, the session service 226 may further determine which data a user is authorized to access from the data domain 238. For example, the session service 226 may send a message to a role-based access control system (RBAC) 230 to determine which data a user of the mobile device 208 is authorized to access from the data domain 238. The RBAC 230 may utilize the authorization service 236 to determine whether the user of the mobile device 208 is authorized to access data from the data domain 238. The RBAC 230 may return a response message to the session service 226 indicating that the user is authorized to access the data, or not authorized to access the data.

The session service 226 may establish one or more channels of data, or other mechanism, for the session. The channels are for data which the user of the mobile device 208 is authorized to access. Each session may comprise one or more channels.

If the session has been established, or once the session has been established, the session service 226 will pass the command on to the sync gateway 240. In operation 408, the sync gateway 240 stores the command in the cache 227.

In operation 410, the server computer (e.g., via command router 232) determines a command processor 234 responsible for processing the command. For example, there may be a plurality of command processors 234. The command router 232 may be looking for commands from the mobile device 208 arriving via the sync gateway 240. Once the command router 232 detects a new command, it analyzes the command to determine the command processor 234 that is responsible for processing the command. In one example the command may have a header that includes an address of the command processor 234 that is responsible for processing the command. The command router 232 may analyze the header to determine the address of the command processor 234 and then send the command to the responsible command processor 234, as shown in operation 412.

The command processor 234 is responsible for interacting with the data domain 238 to pass on the command so that it can be processed at the data domain 238 and the data domain 238 (e.g., source of truth) can be updated. For example, a data object in the data domain 238 may be updated according to instructions included in the command.

Figure 5:
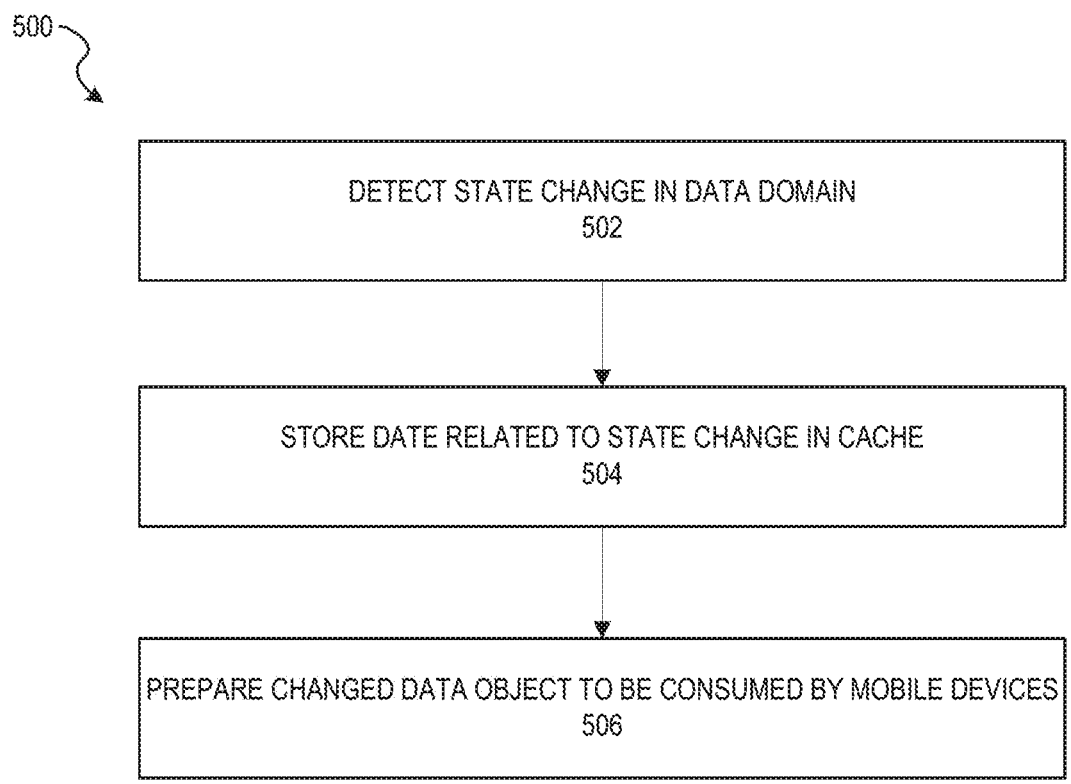
FIG. 5 is a flowchart illustrating aspects of a method for detecting a state change in a data domain and preparing data changes to be consumed by mobile devices, according to some example embodiments.

FIG. 5 is a flow chart illustrating aspects of a method 500 for detecting a state change in a data domain 238 and preparing data changes to be consumed by mobile devices with access to the data, according to some example embodiments. For illustrative purposes, method 500 is described with respect to the mobile device 208 and IIOT cloud 206 of FIG. 2. It is to be understood that method 500 may be practiced with other system configurations in other embodiments.

In operation 502, the server computer (e.g., via sync processor 228) detects a state change in the data domain 238. For example, the sync processor 228 may detect that a data object has been updated in the data domain 238 (e.g., showing that a car in a train yard has been moved to a new location).

Figure 9:
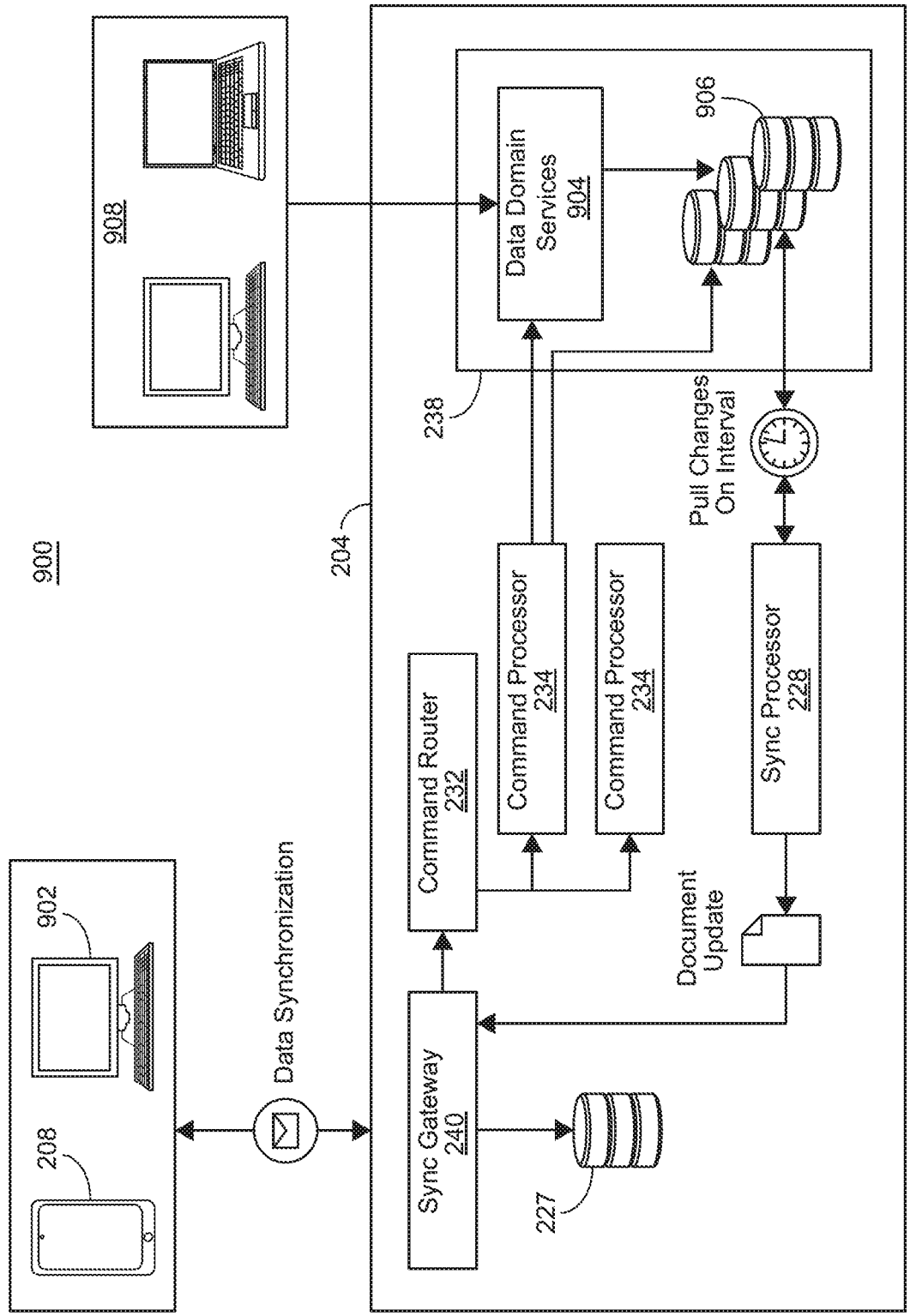
FIG. 9 is a block diagram illustrating pull synchronization, according to some example embodiments.

In one example, the sync processor 228 may detect that a data object has been updated in the data domain 238 by polling the data domain 238 or pulling the data from the data domain 238, as shown in FIG. 9. FIG. 9 shows the sync processor 228 pulling data from a data domain 238. The data domain 238 may comprise data domain services 904 and one or more databases 906. The data domain 238 may also receive data from client devices 908 (e.g., data updates, administrative updates, etc.). In this example, the sync processor 228 may pull updates on a regular time interval and then send the changes to the sync gateway 240 to store in the cache 227 so that devices, such as mobile devices 208 or other devices 902 (e.g., desktops or other client devices), may receive the updated data.

Figure 10:
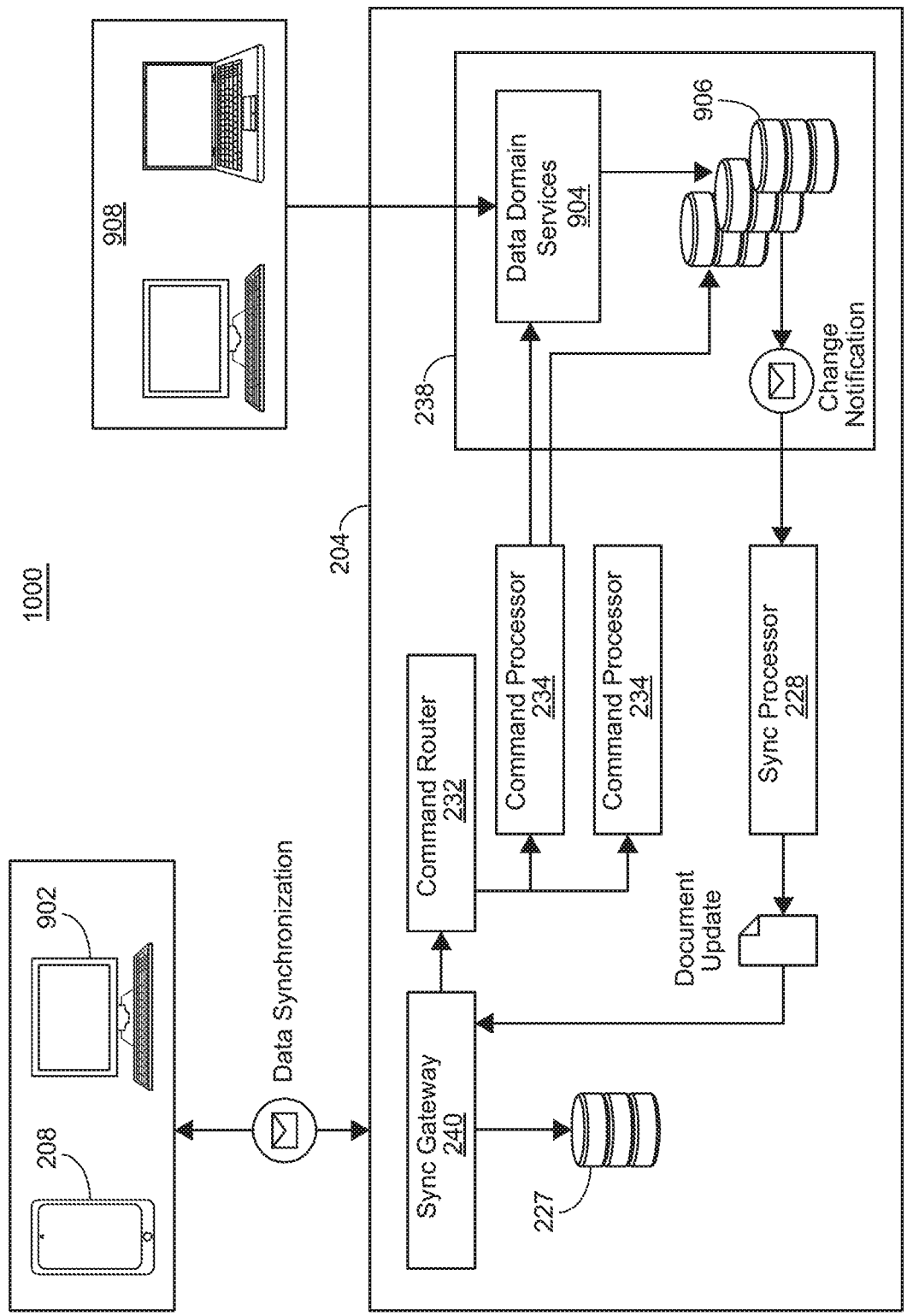
FIG. 10 is a block diagram illustrating push synchronization, according to some example embodiments.

In another example, the sync processor 228 may detect that a data object has been updated in the data domain 238 by pushed data from data domain 238, as shown in FIG. 10. In this example, the sync processor 228 may receive a notification of updates from the data domain 238. For example, the sync processor 228 may subscribe to get notified of any updates or changes to the data in the data domain 238. The sync processor 228 may retrieve the data once it receives a notification or the updated/changed data may be included in a message with the notification. The sync processor 228 may then send the changes to the sync gateway 240 to store in the cache 227 so that devices, such as mobile devices 208 or other devices 902 (e.g., desktops or other client devices), may receive the updated data.

Returning to FIG. 5, the sync processor 228 may retrieve the data object and store it in the cache 227, as shown in operation 504. In operation 506, the sync gateway 240 prepares the changed data object to be consumed by mobile devices 208 (e.g., to be replicated to mobile devices operated by users authorized to access the data object). For example, the sync processor 228 may transform the data to be optimized for the mobile application. For example, the sync processor 228 may extract the minimum amount of data needed by the application so as not to use more resources than necessary. For instance, the entire database with the data that has been changed is likely unnecessary, and thus, the sync processor 228 may only extract the data that is needed to update the application.

The data will then be replicated to the mobile devices 208 to which have access to the data. For example, if the change is related to train cars on rail yard X, then the users that have access to rail yard X will receive the updated data. Each mobile device 208 will receive the data and update the local database on the mobile device 208.

The development platform further comprises a development interface or development took, such as a command-line tool that allows developers to manage industrial internet applications and service processes with the back-end process of the IIOT cloud 206. The command-line tool includes a set of commands that are invoked through a command-line interface. Developers may use the command-line interface to build industrial internet applications using the SDK and deploy them to the cloud. The developers may further create command processors and sync processors for interacting with a data domain 238. Some example commands may comprise: api, apps, auth, channels, data-delete, define, grant, import, logs, oauth-token, publish, revoke, routes, and webapps.

The api command may be used to display the current target, set the target, or change the target API gateway service. The apps command allows a developer to view which industrial internet applications the developer has deployed. Calling this command may return a list of industrial internet applications and information about each application. For example, each application may have a type, name, version, and channel.

The auth command may be used to authenticate a user against a currently targeted API gateway host. This may allow the developer to access an administrator port of the sync gateway 240.

The channels command may be used to manage the readable channels assigned to each user. As explained above, channels may be how data gets delivered between the mobile service platform 204 and the mobile devices 208. The channels command may allow a developer to specify one or more channels, list channels, purge documents (e.g., JSON objects) from all channels specifying one or more users, display a user channel document, assign a channel to a user, delete (e.g., purge) a channel from a user document, work with multiple users/channels, and so forth.

The data-delete command allows a developer to delete data. The grant command allows a developer to grant access to an industrial internet application for a specified user account. The revoke command may be used to revoke access to an industrial internet application for a specified user account. The import command allows the developer to import data for an industrial internet application. The logs command allows a developer to view access logs or error logs from the sync gateway 240 and API gateway 224. The oauth-token command may be used to display an authentication token for an authenticated user account.

The publish command may be used to upload a web app. An industrial internet application may have one or more web apps that are contained in the industrial internet application. For example, each web app could be a component of the industrial internet application. In one example the industrial internet application may be for managing train cars in a rail yard. The industrial internet application may comprise several web apps, such as one web app for moving cars from one location to another, another web app for drawing a visual representation of the train yard, and so forth. The publish command is used to publish these web apps. Since web apps may be published individually, a developer may update a particular web app without having to update the entire industrial internet application. Thus, only the parts that changes need to be downloaded and updated, not the entire industrial internet application.

The routes command may be used to list all defined routes that a command router is aware of. For example, the command router 232 may read a table of routes and map the URL of the command to that table and then know which command processor to which to send the command. The routes are used to route commands to individual command processors. Any document created with a type equal to command may be routed to a command processor and processed. A command router is a microservice that is tasked with routing pending command documents to configured command processors. In one example, a command document is a JSON document with a type field value as command and a status field. The command document format may be similar to an HTTP request, with a request and response section contained in the same document.

The command router manages the state of a given command from the time the document arrives on the server until the router writes the result from an invoked command processor to the response section of the document. The command router translates a command document into an equivalent HTTP request to a command processor. The HTTP response from the command processor is serialized and placed in the response section of the originating command document.

The add-route command may be used to associate an HTTP URL with a named command route. For instance, a route named/search can be associated with the URL http://predix-mysearch-webapp.run.aws-usw02-pr.ice.predix.io. Any command discovered by the command router containing this name is then sent to the web service running at http://predix-mysearch-webapp.run.aws-usw02-price.predix.io to be processed.

The remove-route command may be used to remove an HTTP URL associated with a named command route. The webapps command may be used to list all web apps uploaded to a particular industrial internet application instance.

Figure 6:
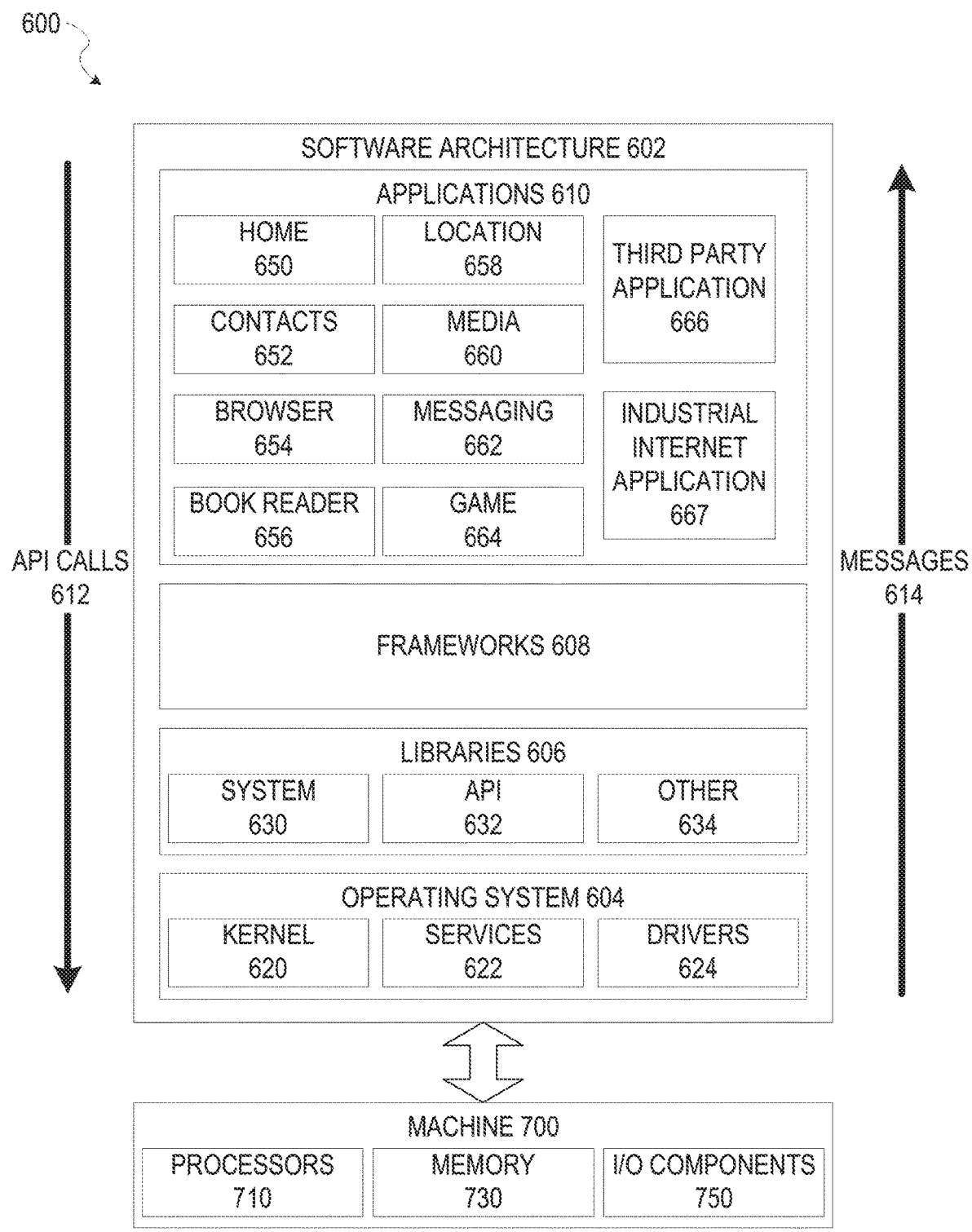
FIG. 6 is a block diagram illustrating an example of a software architecture that may be installed on a machine, according to some example embodiments.

FIG. 6 is a block diagram 600 illustrating a software architecture 602, which can be installed on any one or more of the devices described above. For example, in various embodiments, IIOT machine 104, interface device 140, and servers associated with 108A-108E, 110, 112, 114, 116 120, 122, 124, 128, and 130, and the IIOT cloud 206 may be implemented using some or all of the elements of software architecture 602. FIG. 6 is merely a non-limiting example of a software architecture 602, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as a third party applications 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 666 can invoke the API calls 612 provided by the operating system 604 to facilitate functionality described herein.

Some embodiments may include one or more Industrial Internet applications 667. In certain embodiments, this may be a stand-alone application that operates to manage communications with a server system such as the asset cloud computing system 106. In other embodiments, this functionality may be integrated with another application. Industrial Internet application 667 may request and display various data related to industrial assets and options for configuring and interacting with industrial assets, and may provide the capability for a user to input data related to industrial assets via a touch interface, keyboard, or using a camera device of machine 700, communication with a server system via I/O components 750, and receipt and storage of data in memory 730. Presentation of industrial asset information and user inputs associated with industrial assets may be managed by Industrial Internet application 667 using different frameworks 608, library 606 elements, or operating system 604 elements operating on a machine 700.

Figure 7:
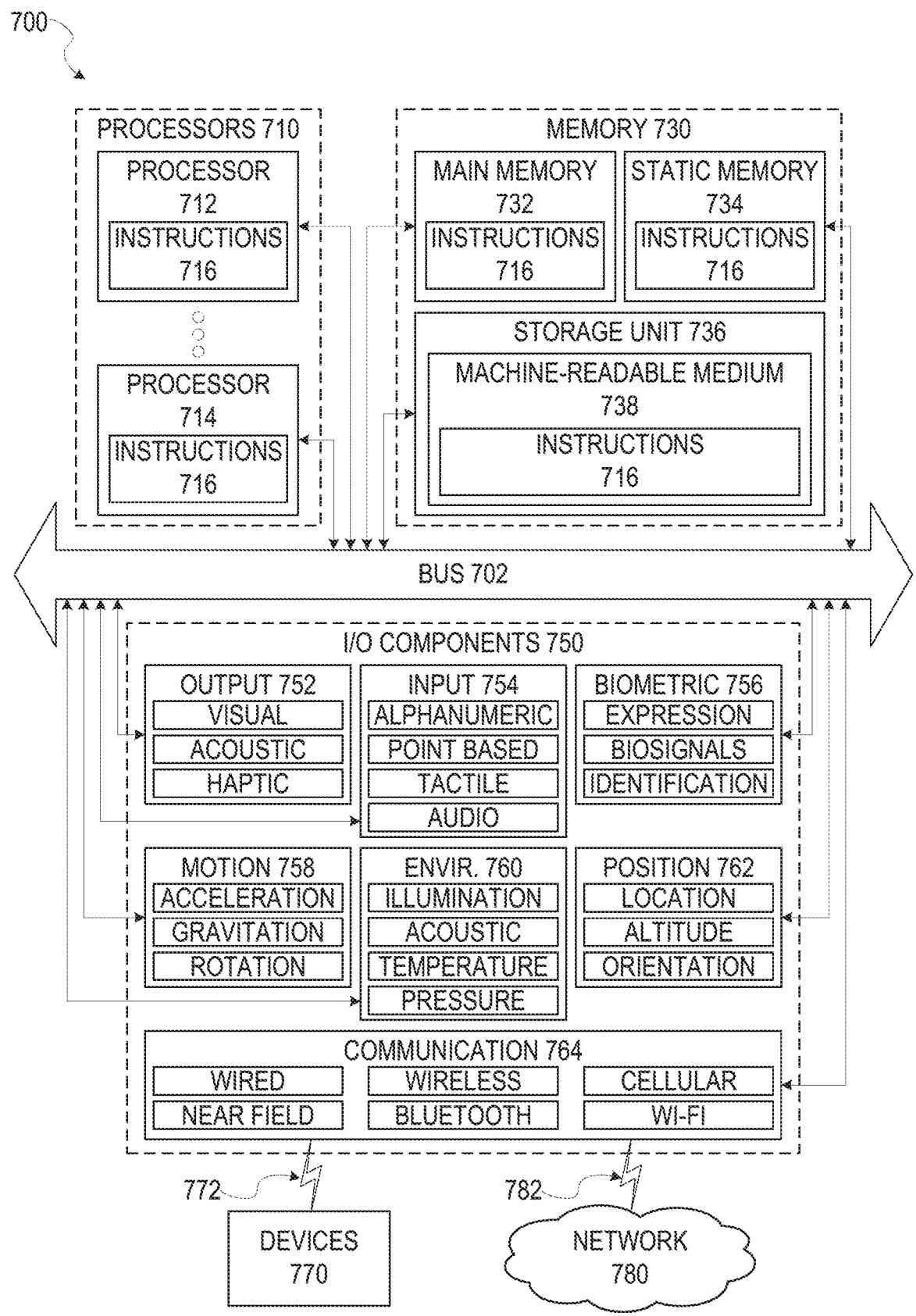
FIG. 7 is a diagrammatic representation of a machine, in the form of a computer system, within which a set of instructions may be executed for causing the machine to perform any one or more of the methodologies discussed herein, according to some example embodiments.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or client device in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the medium 738 should be considered as being transportable from one physical location to another. Additionally, since the machine-readable medium 738 is tangible, the medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A mobile device comprising:
a storage configured to store a software development kit (SDK) comprising a container with services packaged therein for developing industrial software applications; and
a processor configured to execute a boot service from the container which starts-up an industrial software application on a remote platform, execute a window service from the container which controls how the industrial software application is displayed, and execute a notification service from the container which transmits events from the mobile device to the industrial software application on the remote platform.

2. The mobile device of claim 1, wherein the processor is further configured to execute an authentication service from the container which authenticates a user when accessing the industrial software application.

3. The mobile device of claim 1, wherein the processor is further configured to execute a user information service which retrieves identification data of a currently logged-in user of the industrial software application and displays the identification data within the industrial software application.

4. The mobile device of claim 1, wherein the processor is further configured to execute one or more custom services from the container which extend a base functionality of the services packaged within the container.

5. The mobile device of claim 1, wherein the container further comprises a local database which stores data of an industrial asset that is accessed by the industrial software application.

6. The mobile device of claim 5, further comprising a network interface configured to transmit a request to synchronize data between a data domain on the remote platform and the local database within the container.

7. The mobile device of claim 1, wherein when executed, the boot service transmits a hypertext transfer protocol (HTTP) POST command and a uniform resource locator (URL) to the remote platform to startup the industrial software application.

8. The mobile device of claim 1, wherein when executed, the notification service runs a script function in the industrial software application to transmit event notifications from the mobile device to the industrial software application.

9. The mobile device of claim 1, wherein when executed, the boot service automatically calls an authentication service which authenticates a user when accessing the industrial software application.

10. A method comprising:
storing a software development kit (SDK) comprising a container with services packaged therein for developing industrial software applications;
executing a boot service from the container which starts-up an industrial software application on a remote platform;
executing a window service from the container which controls how the industrial software application is displayed; and
executing a notification service from the container which transmits events from a mobile device to the industrial software application on the remote platform.

11. The method of claim 10, further comprising executing an authentication service from the container which authenticates a user when accessing the industrial software application.

12. The method of claim 10, further comprising executing a user information service which retrieves identification data of a currently logged-in user of the industrial software application and displays the identification data within the industrial software application.

13. The method of claim 10, further comprising executing one or more custom services from the container which extend a base functionality of the services packaged within the container.

14. The method of claim 10, wherein the container further comprises a local database which stores data of an industrial asset that is accessed by the industrial software application.

15. The method of claim 14, further comprising transmitting a request to synchronize data between a data domain on the remote platform and the local database within the container.

16. The method of claim 10, wherein the executing the boot service comprises the boot service transmitting a hypertext transfer protocol (HTTP) POST command and a uniform resource locator (URL) to the remote platform to startup the industrial software application.

17. The method of claim 10, wherein the executing the notification service comprises the notification service running a script function in the industrial software application to transmit event notifications from the mobile device to the industrial software application.

18. The non-transitory computer-readable medium of claim 17, wherein the method further comprises executing an authentication service from the container which authenticates a user when accessing the industrial software application.

19. The method of claim 10, wherein the executing the boot service comprises automatically calling, via the boot service, an authentication service which authenticates a user when accessing the industrial software application.

20. A non-transitory computer-readable medium storing instructions which when executed by a processor cause a computer to perform a method comprising:
storing a software development kit (SDK) comprising a container with services packaged therein for developing industrial software applications;
executing a boot service from the container which starts-up an industrial software application on a remote platform;
executing a window service from the container which controls how the industrial software application is displayed; and
executing a notification service from the container which transmits events from a mobile device to the industrial software application on the remote platform.

* * * * *